Oct. 14, 1958     F. T. STANCHUS     2,856,509
ARGON SHIELDED ARC WELDING

Filed July 10, 1953     2 Sheets-Sheet 1

INVENTOR
FRANK T. STANCHUS
BY Barnwell R. King
ATTORNEY

Oct. 14, 1958 F. T. STANCHUS 2,856,509
ARGON SHIELDED ARC WELDING
Filed July 10, 1953 2 Sheets-Sheet 2

INVENTOR
FRANK T. STANCHUS
BY Barnwell R. King
ATTORNEY

United States Patent Office 2,856,509
Patented Oct. 14, 1958

2,856,509

ARGON SHIELDED ARC WELDING

Frank T. Stanchus, West Orange, N. J., assignor to Union Carbide Corporation, a corporation of New York Application July 10, 1953, Serial No. 367,237

3 Claims. (Cl. 219—74)

This invention relates to gas shielded arc welding, and more particularly to such welding shielded with a stream of gas composed of super-high purity argon.

Recently there has come into vogue two types of inert gas shielded arc welding. One involves the use of a refractory and relatively non-consumable metal electrode composed of tungsten, known as "tig" welding; the other involves the use of a fusible and consumable metal electrode, known as "sigma" welding (shielded inert-gas metal-arc). Virtually all metals including otherwise hard-to-weld metals such as aluminum and stainless steel can be welded without the use of flux by both types. The fundamentals of the processes are disclosed in the Welding Journal for April 1953, pp. 299–312, by W. H. Wooding.

Prior to this invention the trend was to mix oxygen with commercially pure argon, i. e., 99.80%–99.90% pure argon and 1.00%–5.00% by volume of oxygen, in order to improve the process, especially in the case of sigma welding.

According to the present invention, however, the art of shielded inert gas arc welding is substantially advanced, especially in the case of aluminum and the alloys thereof, and in the case of titanium and its alloys, by shielding the arc with a stream composed of gas containing super-high purity (99.99%+ pure) argon having an extremely low content (less than about 100 parts per million) of impurities including nitrogen, while effectively excluding all air from the arc with such shielding gas stream. As a result the welding action is considerably smoother and more stable with less splatter or spatter, starting is improved, better coalescence of the metal results, cleaning action is superior, the arc length is more flexible and somewhat longer, speed of welding is unexpectedly increased with a saving of gas and time, and the surface appearance of the resulting weld is cleaner and much more attractive than that of the prior art. The gas is preferably dry, i. e., contains less than 6 grains of moisture per 1000 cubic feet thereof.

Figure 1:
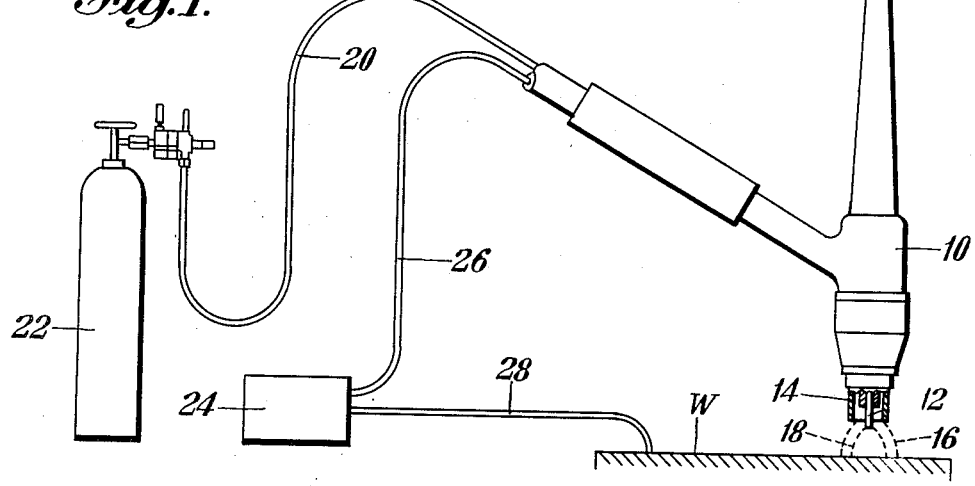
Fig. 1 is a view mainly in elevation of a refractory metal electrode inert gas shielded welding set-up illustrating the invention.

Fig. 1 shows a torch 10 having a refractory metal, such as tungsten, electrode 12 depending from within a nozzle 14 from which a stream 16 of arc shielding gas is discharged around the arc 18 formed between the end of such electrode and the work W being welded. The arc shielding gas is supplied to the torch 10 through a hose 20 from a cylinder 22 containing the gas under pressure. Welding current is supplied to the arch 18 from a suitable source 24 of electric power through leads 26 and 28 which are connected to the electrode and work, respectively. The cylinder 22 contains argon of super-high purity.

In carrying out the invention with the apparatus of Fig. 1, the arc 18 is struck between the end of the electrode 12 and the work W, fusing such work in the zone under such arc. The arc 18 and the heated end of the electrode and the fused work metal are shielded by the stream 16 of shielding gas which flows from the nozzle 14 around the arc, which gas is preferably super-high purity argon. Simultaneously with such shielding, diffusion of the surrounding air into the welding arc is excluded entirely.

Figure 2:
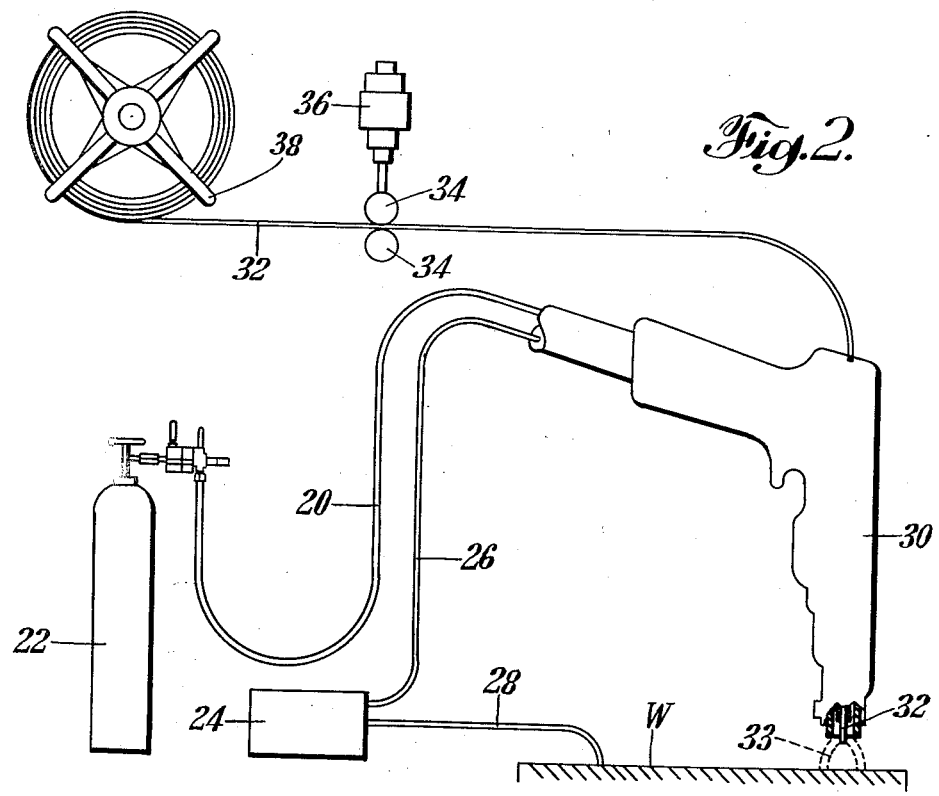
Fig. 2 is a similar view of a sigma welding set-up.

In Fig. 2 there is shown a sigma welding set-up comprising a welding gun 30 through which a consumable electrode in the form of a wire 32 is fed toward the arc 33 at relatively high speed by rod feed rolls 34 which are driven by a motor 36, the wire being drawn from a supply reel 38. The other connections are similar to those shown in Fig. 1. In carrying out the invention with the apparatus of Fig. 2, conventional sigma welding techniques in general are employed with the exception that the gas supplied from cylinder 22 to the gun 30 is super-high purity argon. Improvements in sigma welding resulting from the use of such argon are detailed below.

It is known that basic differences exist between helium shielded arc welding and argon shielded arc welding. Because of its commercial availability, helium was the first to be used on a large scale. The commercial use of argon was made difficult by the lack of a supply, and little was known about the effect of gas purity on arc welding characteristics and results. The commercial introduction of argon as a shielding medium for electric arc welding was faced with difficulties. Comparisons between helium and argon favored helium because relatively little was known about the limitations and advantages of argon. For example, a large producer of aluminum beer barrels was able to arc weld with helium shielding at three times the speed of the argon shielded arc welding. In the comparisons argon of commercial purity was used.

The chief problem encountered in the development of the shielded inert gas-metal-arc welding of aluminum was porosity and arc instability resulting from varying arc lengths. The use of specially purified helium containing 12 p. p. m. of hydrogen eliminated porosity normally encountered with commercial helium in tungsten arc welds on ⅛-in. and ½-in. thick aluminum. While the weld surfaces were fairly bright, the cleaning action characteristic of argon welds was not present when helium was used.

Satisfactory argon shielded arc welds were made when the hydrogen content in the argon shielding gas was less than 50 p. p. m., and the moisture content thereof was less than 16 p. p. m. Furthermore, serious nitride formation in aluminum welds was encountered when nitrogen contamination reached 1700 p. p. m. or more. Work was undertaken to determine the nature of the gas in aluminum. A literature survey indicated that hydrogen was likely to be the only gas causing trouble in the welding of aluminum. The first tests were unsuccessful because of foreign gas coming from the crucible and from the large volume of residual gas in the aluminum welds. The literature study yielded solubility-temperature data for hydrogen in aluminum in the temperature range from 600° C. to 1000° C. But reliable information on the temperature distribution in aluminum during welding was not available. Work proceeded to determine methods for avoiding porosity by calculations involving temperature gradients and hydrogen solubility.

Therefore, it was concluded that hydrogen and moisture caused porosity in aluminum welds. A limit of 50–60 p. p. m. of hydrogen in argon could be tolerated before porosity occurred in the aluminum weld metal. If the total hydrogen content, as derived from hydrogen gas or breakdown of moisture, reached 150 p. p. m. porosity was quite noticeable. If the hydrogen content reached 2000 p. p. m. the welds would be very porous. A minimum specified argon purity of 99.80% was not believed to ensure sound welds in aluminum because of excess hydrogen. The limit of total hydrogen, as derived from hydrogen gas and moisture, was specified as 60 p. p. m. (One grain of moisture per one thousand cubic feet of argon contains approximately 3 p. p. m. of hydrogen by volume. The sum of gaseous hydrogen in p. p. m. plus 3 times the moisture in grains per thousand cubic feet should be less than 60.)

The development of oxygen-argon mixtures resulted in the elimination of some porosity in aluminum welds, and aided in the production of vertical, horizontal and overhead welds.

Figure 3:
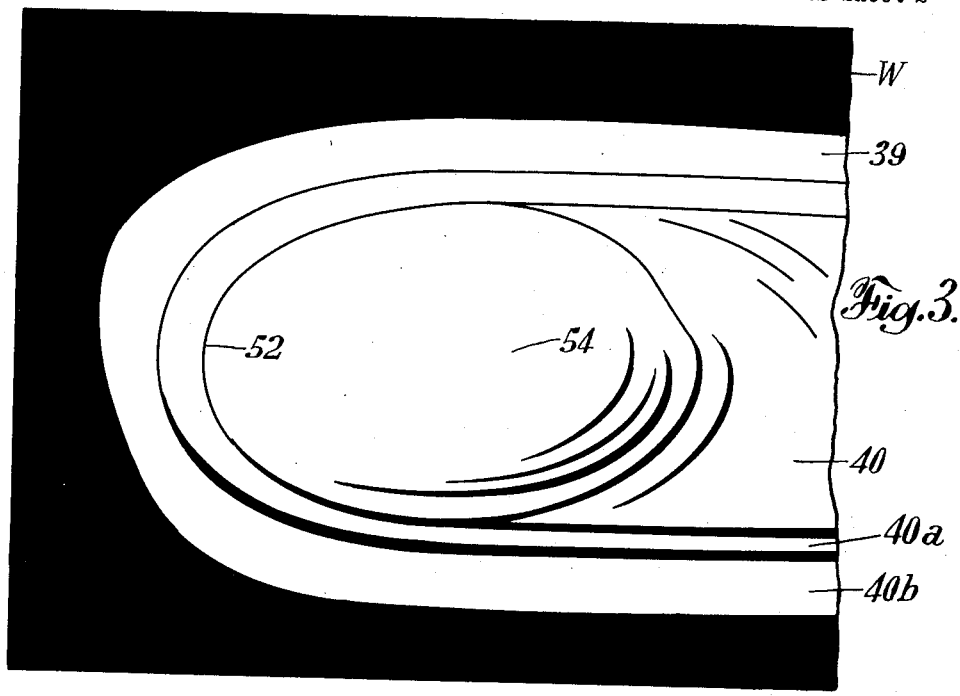
Fig. 3 is a greatly enlarged plan view of a sigma weld made according to the invention with 99.99%+ purity argon.

The sigma welding operation, Fig. 2, using super-high purity argon as the shielding gas is less critical because of improved coalescence of the molten weld metal, Fig. 3, with the base metal. Fig. 3 illustrates the weld bead 39 on the base plate or work W. The weld proper 40 is bounded on its leading and side edges by a transition area 40a which has the appearance of having been beneficially fluxed. The edge zone 40b has undergone the "cleaning action" which is generally characteristic of commercial argon but which is unexpectedly present with super-high purity argon gas shielding.

Figure 4:
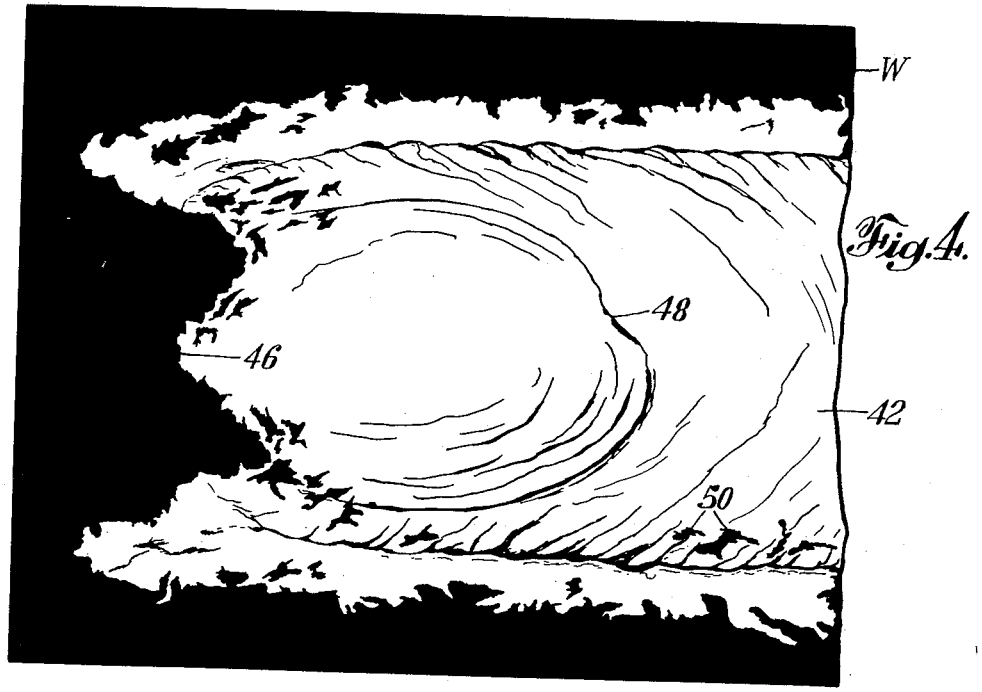
Fig. 4 is a similar view of a sigma weld made according to the prior art with 99.84% purity argon.

The weld 40, Fig. 3, required less skill to make with 99.99+ percent purity argon gas shielding than the weld 42, Fig. 4, with 99.84 percent purity argon gas shielding. It was comparatively very difficult to make a good weld with 99.84 percent purity argon. With the latter it was practically impossible to weld in the overhead position because of the relatively poor "cleaning action" and unsatisfactory bead coalescence. The weld 42 also was difficult to start, and it was difficult to maintain the weld bead even in the downhand position.

With an argon purity of 99.998 percent, Fig. 3, the weld bead contour from the start and throughout, is quite uniform and was easier to deposit than with the lower purities. The weld 40 was about 100% easier to make than the weld 42. The weld 42, made with the 99.84 percent pure argon gas shielding, was practically impossible to deposit in the overhead position.

Not shown in Fig. 4 is the start of the weld 42 which is peaked, irregular and poor. This condition in an overhead weld is not desirable. Note in Fig. 3 that a normal contour occurs from the start. In starting it is very important to establish normal welding conditions as quickly as possible and ultra-high purity (99.99+ percent) argon gas shielding unexpectedly accomplishes such improvement.

The better coalescence between weld metal and base metal which results when welding with super-high purity argon gas shielding has the following advantages. It helps to eliminate cold laps. Obviously, on the second pass, cold laps, or unfused portions, must be fused into the base metal. So, in the second pass, the operator must concentrate not only on depositing the second pass properly but must, in addition, concentrate on correcting a poor edge condition which resulted from the first pass. While a highly skilled operator could undoubtedly perform this operation, relatively unskilled operators would have difficulty in correcting the poor edge condition of the first pass. A relatively poor weld would result because the correction of the cold laps would detract from adequate penetration.

The importance of coalescence also is illustrated in Figs. 3 and 4. The weld of Fig. 4 shows a poor edge condition as obtained with argon of 99.84 percent purity. On the other hand, in Fig. 3, using argon gas having a purity of 99.995 percent, the improved edge condition of the weld 40 resulting from good coalescence, is very obvious.

"Cleaning action" can be defined as a condition wherein the oxides and nitrides are broken down to allow better fusing of the deposited filler wire with the base metal. For example, notice a black smudge 46 directly ahead of the weld puddle 48, that is, in the vicinity of the weld crater where the weld was interrupted. The black smudge 46 prevents welding progress because it has to be broken up before welding can proceed. Also, it is well known in the welding of aluminum that the metal must be clean. The deposit made with 99.84 percent argon is in an unsatisfactory condition because of the islands of scale 50. Such islands of scale are not present in weld 40, Fig. 3.

Fig. 3 illustrates the excellent "cleaning action" which results from the use of the 99.998 percent super-high purity argon according to the invention. Note especially, that the leading edge 52 of the puddle 54 is free to coalesce with the base metal. The leading edge 52 also is free of oxides, nitrides, or other undesirable scale. As a result of such good "cleaning action" welding can progress at a higher speed.

While the use of super-high purity argon is principally discussed herein relative to the welding of aluminum, a shield of said super-high purity argon helps to solve the serious problem of welding titanium. Great impetus has been given to the refining and welding of titanium by the spectacular growth of the jet engine industry where such an alloy is useful because of its good physical properties, corrosion resistance, and lower weight. But these desirable physical properties are deleteriously affected by the contaminants of commercially available inert gases. The use of super-high purity argon as a shielding medium practically eliminates the injurious contaminants, mainly nitrogen, oxygen, and hydrogen. For example, weld beads made in a controllable-atmosphere chamber on commercially pure titanium showed that super-high purity argon yields ductility results considerably better than those obtained with commercially pure argon. The minimum bend radius for RC-70 titanium welded with 99.985 percent argon was better than 1.3X. For the same conditions, the substitution of 99.94 percent pure argon gave weld beads capable of a minimum bend radius greater than 2½X. Thus, argon approaching the super-high purity range gave approximately 100 percent improvement over argon in the commercial purity range.

A further advantage of the use of super-high purity argon as the shielding gas for arc welding exists in a greater flexibility of arc length. Where voltage control is used to maintain an arc length of a predetermined value, the voltage control tries to maintain a preset value but never quite achieves it. That is, at a given instant the arc may be slightly too short, and at the next instant, the arc may be slightly too long, so that the arc length varies excessively. Super-high purity argon gas shielding extends the range of usable arc length, thereby producing more latitude in the control operation. Such improvement contributes to better welding conditions. The observed improvement was demonstrated in a series of sigma welding tests using 1/16-in. diameter aluminum welding wire, a welding current of approximately 180 amps., and an aluminum base metal having a thickness of ¼-in. It was noted that an approximately 1/16-in. longer arc could be maintained with the 99.995 percent as compared to 99.93 percent pure argon.

The problem was presented of sigma welding ⅛-in. thick type 2S aluminum in the vertical and overhead positions, wherein a gap of 1/16-in. existed between the abutting edges. First, super-high purity argon was used as the arc shielding gas with 3/64-in. diameter welding wire. A very satisfactory weld was made, thus filling the gap caused by bad fit-up—a situation of fairly frequent occurrence. An arc could be carried and a weld made under conditions that according to the prior art were practically impossible with helium. On a similar joint, using helium as the shielding gas, it was also practically impossible to make a weld with ³⁄₆₄-in. rod. Using helium and ¹⁄₁₆-in. diameter welding wire, the weld could be made on heavier material, however, such larger-size wire is too large for the ⅛-in. thickness with the ¹⁄₁₆-in. gap. This highlights a substantial advantage of super-high purity argon over helium.

Welding (sigma) tests were made using cylinders of argon having the following analyses.

*Argon analyses*

| Cylinder Designation | Argon, Percent | Nitrogen, p. p. m. | Oxygen, p. p. m. | Hydrogen, p. p. m. | Hydrocarbons, p. p. m. | Moisture, gr./1,000 C. F. |
|---|---|---|---|---|---|---|
| A | 99.920 | 700 | 3 | 6.0 | 1.5 | 2.0 |
| B | 99.999 | 3 | | | | |
| C | 99.840 | 1,000 | | | | |
| D | 99.998 | 40 | 2.0 | 3.5 | 3.5 | 1.5 |
| E | 99.995 | 50 | 4.0 | 5.0 | 1.0 | 1.0 |
| F | 99.930 | 700 | 3.5 | 4.0 | 4.0 | 2.5 |

Note that nitrogen constitutes the major impurity. Hence, "super-high purity" argon also might be called "low nitrogen" argon. In this discussion, "super-high purity" argon is 99.99+ percent pure, and argon in the range 99.92–99.96 percent is standard purity of the grade currently furnished for sale.

Gas flows used in the tests were purposely limited to provide maximum indication of differences in purity.

Hand tig fillet and butt welds were made in ⅛-in. 2S aluminum using ³⁄₃₂-in. thoriated tungsten electrodes with 20 C. F. H. of shielding gas. Filler rod was added continuously as contrasted to the usual method of "dipping" the rod. In this work, a comparison of 99.920 percent pure argon, cylinder A, and 99.999 percent argon, cylinder B was made. The welding speed using either purity of argon was of the order of 9 in./min. and virtually no difference was observed with respect to the ease of adding filler rod in this manner. Similar tests in making butt welds showed an increase in linear welding speed, 17½ versus 16½ in./min. for the super-high purity argon type.

Hand tig corner and lap welds were made in ⅛-in. 2S material using ³⁄₃₂-in. thoriated tungsten electrode and 15 C. F. H. of shielding gas. Cylinders A and B were again used to determine the effects of relative argon purity on linear welding speed. In this series of tests no filler rod was added. Comparable corner welds under identical conditions were made with both purities of argon and the net welding speeds were 15.6 in./min. with the super-high purity argon and 14.7 in./min. with the standard purity argon. The difference in welding speed was even more pronounced in making lap welds where relatively low currents were employed. With the super-high purity argon a progression speed of 6.9 in./min. was realized, whereas with the standard purity argon the progression speed was limited to 4.2 in./min. These latter results show approximately a 50 percent speed advantage for the super-high purity argon.

In order to further explore the matter, mechanized tungsten arc edge welds were made on ⅛-in. 2S aluminum plate using ⅛-in. thoriated tungsten electrodes and 15 C. F. H. of shielding gas. Cylinders A and B were again employed. A speed of 90 in./min. was obtained using the super-high purity argon, whereas it was necessary to reduce the speed to 60 in./min. with the standard purity argon to obtain equivalent appearance and continuity of coalescence. (Note that super-high purity argon produced a 50 percent higher speed of welding.)

Hand sigma welds were made in ½-in. thick 2S aluminum prepared with a 60 degree double V with a ³⁄₃₂-in. nose. A flow of 40 C. F. H. of shielding gas was used in comparing 99.999 percent with 99.930 percent purity argon. With the super-high purity argon a linear welding speed of 27.7 in./min. was realized, whereas with the 99.930 percent purity argon the maximum speed was limited to 25.0 in./min. It was observed that with the super-high purity argon the cleaning action and appearance of the weld bead were definitely superior to those with the usual high-purity argon. Since the use of super-high purity argon implements the "stringer bead" technique, it helps to reduce porosity in such case.

Several overhead fillet welds were made using ¼-in. thick 61ST6 aluminum with ¹⁄₁₆-in. diameter No. 23 rod. Such fillet welds were made at the maximum welding speed possible, that is, the speed above which cold laps occurred. The differences in welding speed were as follows:

Argon purity, percent:  Maximum welding speed (in./min.)
99.840 _____ 17½
99.930 _____ 21.8
99.998 _____ 24.0

The super-high purity argon thus shows an increase in welding speed of about 5% over the 99.930% purity argon and about 50% over the 99.840% purity argon.

In order to further demonstrate the differences obtained in "cleaning action" with the various purities of argon, several sigma weld beads were made by hand on ¼-in. thick 2S aluminum. Vastly superior "cleaning action" and coalescence resulted from the use of the super-high purity argon having a nitrogen content of 3–50 p. p. m. thereof.

Sigma aluminum beads were deposited on thin 2S aluminum at 200 in./min. in an effort to further define differences in "cleaning action" and coalescence obtained with the 99.995% purity argon, cylinder E, and 99.930% purity argon, cylinder F. The results were of the same order of improvement for the invention.

In the sigma welding of carbon steel, differences in undercutting and maximum speed also favor the use of super-high purity argon over the standard purity argon as the shielding gas.

The invention is not limited to arc welding in which the shielding gas consists only of super-high purity argon, but extends to those cases where one or more gases of equally high purity are added to such argon. For example, helium may be mixed therewith without departing from the invention.

I claim:

1. In the art of inert gas shielded arc welding of aluminum and its alloys, the improvement which comprises shielding the arc with argon of at least 99.99% purity having an impurity content of 3 to 50 p. p. m. nitrogen, the balance of such impurity content comprising hydrocarbons, hydrogen, oxygen and moisture, while excluding all air from the arc by the shielding gas, whereby a substantial increase in welding speed and weld quality is obtained.

2. In the art of inert gas shielded arc welding of aluminum and its alloys, the improvement comprising shielding the welding arc with argon of at least 99.99% purity; simultaneously with such arc shielding, excluding entirely diffusion of the surrounding air into the welding arc; and limiting the residual nitrogen in the argon shielding gas to between 3 and 50 p. p. m., whereby the weldability of aluminum and its alloys with respect to rate of traverse is substantially increased.

3. Process of inert gas shielded arc welding aluminum and its alloys, which comprises establishing an arc between an electrode and work composed of the metal to be welded, and effectively excluding all of the surrounding air of the atmosphere from such arc by shielding such arc with a stream of argon gas of super high purity (over 99.99% pure), having a substantially low impurity content (less than 100 p. p. m.), said argon having a nitrogen impurity content of 3 to 50 p. p. m. thereof, the balance of the impurity content comprising hydrocarbons, hydrogen, oxygen and moisture; characterized in that the extremely low nitrogen impurity content of such argon stream has the wholly unexpectedly beneficial effect of substantially increasing the stability of the arc within such stream, which, in turn, makes such arc and shielding gas stream function so that a substantial increase in speed of traverse of the welding operation is made possible.

References Cited in the file of this patent

UNITED STATES PATENTS

| | | |
|---|---|---|
| 2,504,868 | Muller | Apr. 18, 1950 |
| 2,576,793 | Jordan | Nov. 27, 1951 |

OTHER REFERENCES

"Arc in Inert Gases," in The Physical Review, Apr. 1, 1932, pp. 36–39.

"Researches in Arc Welding," in Electrical Engineering, November 1932, pp. 624–627.

"Arc Welding in Argon Gas," in Electrical Engineering, November 1935, pp. 1144–1149.

"Arc Welding Atmospheres," in The Engineering Foundation, June 1938, pp. 1–4.